United States Patent
Qu et al.

(10) Patent No.: US 7,444,200 B1
(45) Date of Patent: Oct. 28, 2008

(54) PREVENTATIVE MAINTENANCE SCHEDULING INCORPORATING FACILITY AND LOOP OPTIMIZATION

(75) Inventors: Peng Qu, Austin, TX (US); Chandrashekar Krishnaswamy, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 11/756,710

(22) Filed: Jun. 1, 2007

(51) Int. Cl.
*G06F 19/00* (2006.01)

(52) U.S. Cl. ..................... 700/121

(58) Field of Classification Search ............ 700/99, 700/103, 110, 121; 702/182, 183, 184
See application file for complete search history.

(56) References Cited

U.S. PATENT DOCUMENTS

| | | | | |
|---|---|---|---|---|
| 5,260,868 A | * | 11/1993 | Gupta et al. | 700/100 |
| 5,940,298 A | * | 8/1999 | Pan et al. | 700/100 |
| 6,128,588 A | * | 10/2000 | Chacon | 703/6 |
| 6,952,680 B1 | * | 10/2005 | Melby et al. | 705/28 |
| 7,289,867 B1 | * | 10/2007 | Markle et al. | 700/121 |

\* cited by examiner

*Primary Examiner*—Albert DeCady
*Assistant Examiner*—Chad Rapp
(74) *Attorney, Agent, or Firm*—Williams, Morgan & Amerson, P.C.

(57) ABSTRACT

A method for scheduling preventative maintenance tasks includes defining a set of global time periods. Members of a set of preventative maintenance tasks associated with a plurality of machines for are scheduled execution during the global time periods based on capacities of the machines and production targets for the machines. A plurality of time slots is defined for a selected global period having a selected preventative maintenance task scheduled for execution therein. A selected time slot from the plurality of time slots is scheduled for performing the selected preventative maintenance task based on work in process levels for with the associated machine over the time slots.

20 Claims, 2 Drawing Sheets

PREVENTATIVE MAINTENANCE SCHEDULING INCORPORATING FACILITY AND LOOP OPTIMIZATION

CROSS-REFERENCE TO RELATED APPLICATIONS

Not applicable.

BACKGROUND OF THE INVENTION

The present invention relates generally to manufacturing and, more particularly, to a method and apparatus for scheduling preventative maintenance activities by incorporating facility and loop optimizations.

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

A semiconductor fabrication facility typically includes numerous processing tools or machines used to fabricate semiconductor devices. The processing machines may include photolithography steppers, etch tools, deposition tools, polishing tools, rapid thermal processing tools, ion implantation tools, and the like. Wafers (or wafer lots) are processed in the tools in a predetermined order and each processing tool modifies the wafers according to a particular operating recipe so that a desired product is formed in or on the wafer. For example, a photolithography stepper may be used to form a patterned layer of photoresist above the wafer. Features in the patterned layer of photoresist correspond to a plurality of features, e.g. gate electrode structures, which will ultimately be formed above the surface of the wafer. When processing of the wafer is complete, the various features formed in or on the wafer, as well as features formed in or on layers that are deposited above the wafer, combined to form the desired product. Exemplary products include processors, memory elements, and the like.

The semiconductor fabrication facility typically also includes metrology tools for collecting data indicative of the physical state of one or more wafers before, during, and/or after processing by the processing tools. Data collected by the metrology tools may be used to characterize the wafer, to detect faults associated with the processing, or to determine the quality of the finished product. For example, a mean critical dimension associated with the various features may be indicative of a performance level of products formed on the wafer and/or the wafer lot. If the wafer state data indicates that the mean critical dimension associated with the feature, (e.g., a gate electrode) is on the lower end of an allowable range for such feature sizes, then this may indicate that the product formed on the wafer may exhibit relatively high performance levels. For example, smaller feature sizes in a processor formed on the wafer may be associated with faster processing speeds. Higher performance products may be sold at a higher price, thereby increasing the profitability of the manufacturing operation.

High-volume manufacturing environments may be used to form the different products concurrently. For example, a single semiconductor fabrication facility may be used to form hundreds of different products including processors of varying processing speeds and/or architectures, memory elements of different types (e.g., EEPROM, flash memory, etc.) and/or sizes (e.g., 64 MB, 128 MB, etc), and the like.

Commonly, processing tools and metrology tools undergo periodic preventative maintenance procedures or calibrations to keep the tools operating efficiently. For example, polishing tools include polishing pads that are periodically conditioned or replaced. Etch tools and deposition tools are periodically cleaned using both in situ cleans or complete disassembly cleans. Steppers are periodically calibrated to maintain alignment accuracy and exposure dose consistency. Metrology tools are also calibrated periodically.

Many of these preventative maintenance (PM) procedures are performed at discrete intervals based on vendor recommendations, past history, and expected degradation rates of consumable items used in the tools. The use of fixed preventative maintenance intervals is not always an effective solution for optimizing tool and line efficiency. If the maintenance activities are performed more often than actually needed, the efficiency of the line and the operation cost of the tool is increased. If maintenance activities are performed less often than needed, product quality and tool reliability may be degraded.

Effective preventative maintenance scheduling is important in a wafer fabrication environment to increase tool availability and decrease future unscheduled down times. These benefits are indirect benefits of the scheduling system, but cannot be easily quantified. The direct outputs of preventative maintenance procedures are productivity loss in the short term.

Typically, mean time between preventative maintenance (MTBPM) values are determined by machine vendors. Scheduling systems may use a warning window based on vendor recommendations for a PM task that allows the PM to be completed at any time within the window without significantly impacting the production line. Fabrication technicians typically adhere strictly to warning windows when performing PM procedures. This approach may be effective when the facility is not running at full capacity and each machine family has enough capacity to handle the wafers in process (WIP) even though some machines in the family may be unavailable. However, when the WIP level is high, performing too many PM procedures may cause the production line to become imbalanced. Moreover, production targets may be missed when the production is volume driven. For example, a fabrication facility may define a minimum number of activities to be finished each shift, day, or week. The situation is further complicated when cluster tools are used, with each chamber potentially having its own PM schedule.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art. The present invention is directed to overcoming, or at least reducing the effects of, one or more of the problems set forth above.

BRIEF SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

One aspect of the present invention is seen in a method for scheduling preventative maintenance tasks. The method includes defining a set of global time periods. Members of a set of preventative maintenance tasks associated with a plurality of machines for are scheduled execution during the global time periods based on capacities of the machines and production targets for the machines. A plurality of time slots is defined for a selected global period having a selected preventative maintenance task scheduled for execution therein. A selected time slot from the plurality of time slots is scheduled for performing the selected preventative maintenance task based on work in process levels for with the associated machine over the time slots.

Another aspect of the present invention is seen in a method for scheduling preventative maintenance tasks. The method includes defining a set of global time periods. A global optimization is performed to schedule members of a set of preventative maintenance tasks associated with a plurality of machines grouped into machine families for execution during the global time periods based on capacities of the machine families and production targets. A plurality of time slots is defined for each of the global periods having at least one of the preventative maintenance tasks scheduled for execution therein. A local optimization is performed to schedule selected time slots within the global time periods for performing the preventative maintenance tasks based on work in process levels for selected machine families associated with the preventative maintenance tasks.

BRIEF DESCRIPTION OF THE SEVERAL VIEWS OF THE DRAWINGS

The invention will hereafter be described with reference to the accompanying drawings, wherein like reference numerals denote like elements, and.

Figure 1:
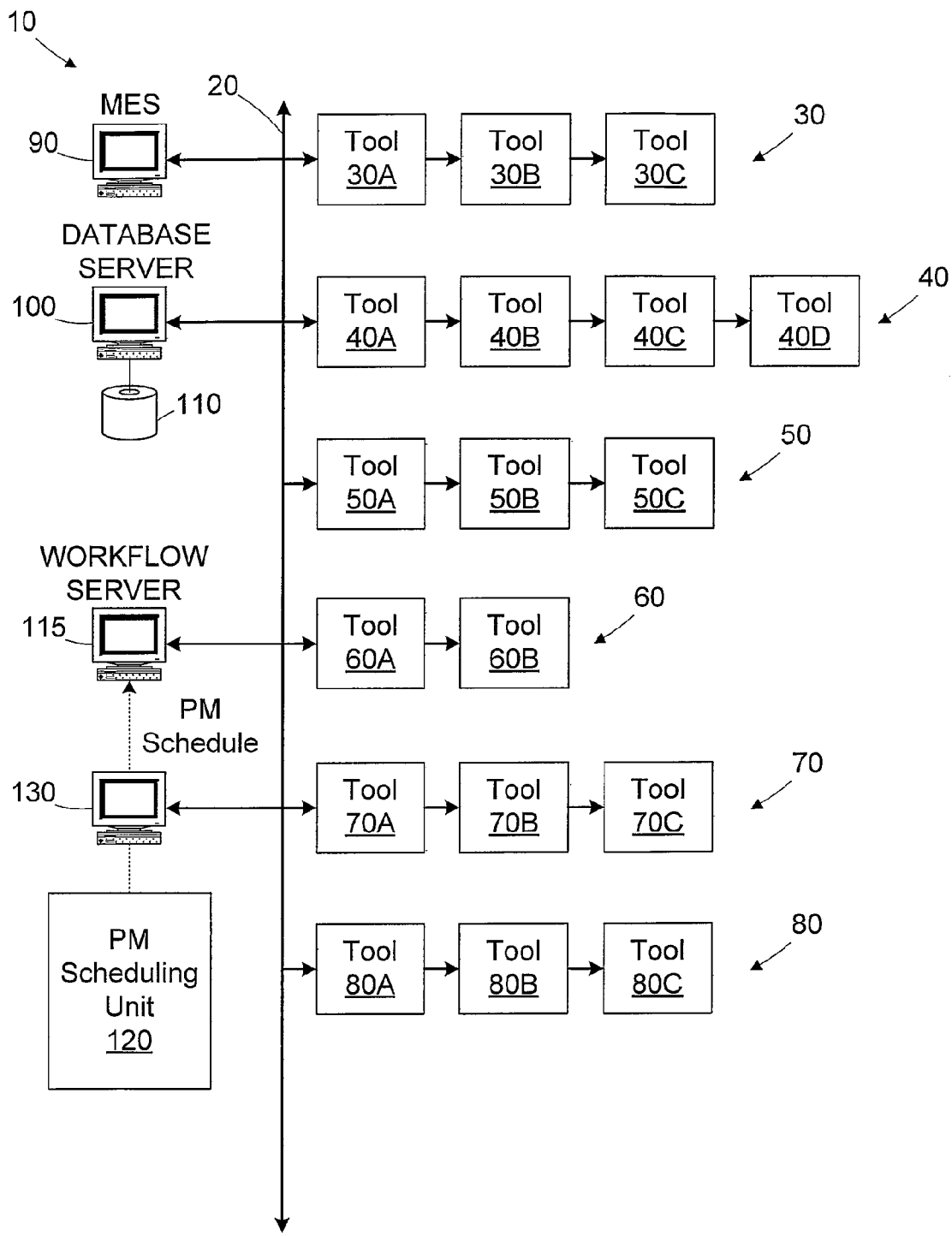
FIG. 1 is a simplified block diagram of a manufacturing system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or CDROM), and may be read only or random access. Similarly, the transmission medium may be twisted wire pairs, coaxial cable, optical fiber, wireless or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to the drawings wherein like reference numbers correspond to similar components throughout the several views and, specifically, referring to FIG. 1, the present invention shall be described in the context of an illustrative manufacturing system 10. The manufacturing system 10 includes a network 20, a plurality of machines 30-80, a manufacturing execution system (MES) server 90, a database server 100 and its associated data store 110, a workflow server 115, and a preventative maintenance scheduling unit 120 executing on a workstation 130.

In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of workpieces or manufactured items, including, but not limited to, microprocessors, memory devices, digital signal processors, application specific integrated circuits (ASICs), or other devices. The techniques may also be applied to workpieces or manufactured items other than semiconductor devices.

The network 20 interconnects various components of the manufacturing system 10, allowing them to exchange information. Each of the machines 30-80 may be coupled to a computer (not shown) for interfacing with the network 20. The machines 30-80 are grouped into sets of like machines, commonly referred to as machine families, as denoted by lettered suffixes. For example, the set of machines 30A-30C represent tools of a certain type, such as chemical mechanical planarization (CMP) machines.

A particular wafer or lot of wafers progresses through the machines 30-80 as it is being manufactured, with each machine 30-80 performing a specific function in the process flow. Exemplary processing tools for a semiconductor device fabrication environment include metrology tools, photolithography steppers, etch tools, deposition tools, polishing tools, rapid thermal processing tools, implantation tools, etc. The machines 30-80 are illustrated in a rank and file grouping for illustrative purposes only. In an actual implementation, the machines 30-80 may be arranged in any physical order or grouping. Additionally, the connections between the tools in a particular grouping are meant to represent connections to the network 20, rather than interconnections between the machines 30-80.

The manufacturing execution system (MES) server 90 directs the high level operation of the manufacturing system 10. The MES server 90 monitors the status of the various entities in the manufacturing system 10 (i.e., lots, machines 30-80) The database server 100 stores data related to the status of the various entities and articles of manufacture in the process flow using one or more data stores 110. The data may include pre-process and post-process metrology data, machine states, lot priorities, etc.

The MES server 90 stores information in the data store 110 related to the particular machines 30-80 (i.e., or sensors (not shown) associated with the machines 30-80) used to process each lot of wafers. As metrology data is collected related to the lot, the metrology data and a machine identifier indicating the identity of the metrology tool recording the measurements may also be stored in the data store 110. The metrology data may include feature measurements, process layer thicknesses, electrical performance, surface profiles, etc. Data stored for the machines 30-80 may include chamber pressure, chamber temperature, anneal time, implant dose, implant energy, plasma energy, processing time, etc. Data associated with the operating recipe settings used by the machine 30-80 during the fabrication process may also be stored in the data store 110. For example, it may not be possible to measure direct values for some process parameters. These settings may be determined from the operating recipe in lieu of actual process data from the machine 30-80.

The workflow server 115 controls the flow of articles of manufacture (e.g., lots of semiconductor wafers) through the process flow, deciding the processing order, which articles are to be sampled by metrology machines 30-80, etc. Hence, the workflow server 115 controls the queues for the processing and metrology resources in the manufacturing system 10. The workflow server 115 can use various workflow management techniques, including dispatching, reservation management, etc., to control the flow of articles.

The distribution of the processing and data storage functions amongst the different computers 90, 100, 115, 130 is generally conducted to provide independence and a central information store. Of course, different numbers of computers and different arrangements may be used. Moreover, the functions of some units may be combined. For example, the workflow server 115 and the preventative maintenance scheduling unit 120 may be combined into a single unit.

In the illustrated embodiment, the workflow server 115 organizes the manufacturing system 10 according to loops. A loop is defined by the plurality of processes performed on a particular layer of a wafer starting with a photolithography patterning step and terminating prior to the next photolithography step. Production targets, referred to as loop counts, are defined for each loop. One loop count reflects one wafer being processed in the loop. Machines in a particular family may be assigned to a particular loop or may be allocated across multiple loops. Hence, for a given time period (e.g., shift, day, or week), each loop is assigned a quota that is expected to be completed. Loop counts not completed in a given shift are added to the quota for the subsequent shift. The preventative maintenance scheduling unit 120 generates preventative maintenance schedules and provides such schedules to the workflow server 115 and/or fabrication personnel to implement the PM tasks in accordance with the schedule.

As will be described in greater detail below, the preventative maintenance scheduling unit 120 determines a preventative maintenance schedule that seeks to minimize the effects on production level targets (i.e., loop counts). The preventative maintenance scheduling unit 120 performs a two-phase optimization first on a global level, and second on a local machine family level to determine the optimal times for performing the PM procedures while minimizing the impact on the production flow. In the manufacturing system 10, loop counts are enforced to keep a steady and balanced production flow. If loop counts are not achieved due to a low WIP level, the remaining loop counts are carried over to next time period and the time to recover from the missing loop counts should be minimized. In determining PM schedules, the preventative maintenance scheduling unit 120 attempts to schedule in a way that machines still have enough capacity to achieve the loop counts, but also maintain a steady WIP level and low maintenance costs.

At the global level of optimization, the preventative maintenance scheduling unit 120 pre-allocates the machine capacities required to achieve the targeted loop counts and attempts to assign PM tasks based on the capacities that are affordable to move within the warning window or even lose. In some embodiments, the preventative maintenance scheduling unit 120 may employ an objective function that seeks to assign PM tasks as late as possible.

In performing the global and local optimizations, the preventative maintenance scheduling unit 120 employs a system of equations that may be solved using mixed integer linear programming techniques. In such an optimization based approach, solutions are driven by a plurality of objectives. Constraints are defined that serve as conditions to narrow down the solution scope. With a commercially or publicly available solver, a linear (either integer or non-integer) solution can be identified within the solution scope. For example, the OSL solver offered by IBM Corporation is a commercially available software tool that may be used. For purposes of the following description, the following notation list provided in Table 1 identifies symbols used in the following objective and constraint equations.

TABLE 1

Notation for Global PM Optimization

Set:

| | |
|---|---|
| M | Set of machine families |
| $\psi$ | Set of time periods (e.g., shift, day, or week) |
| $\psi^c$ | A continuous set of $\psi$ |
| $\Omega$ | Set of PM tasks including all PM tasks of all machines in the planning periods |
| D | Set of devices |
| $\phi_d$ | Set of loops of device $d \in D$ |

Parameters

| | |
|---|---|
| $\mu_{d,l,m}$ | Unit processing time at machine family $m \in M$ of wafers of device $d \in D$ at loop $l \in \phi_d$ |
| $T_{d,l,t}$ | Target loop count of device $d \in D$ at loop $l \in \phi_d$ at period $t \in \psi$ |
| $S_{m,t}$ | Percentage of capacity of machine family $m \in M$ at period $t \in \psi$ used for setups |
| $\lambda_{i,m}$ | =1 if PM task $i \in \Omega$ is for machine family $m \in M$, = 0 otherwise |
| $N_m$ | Number of machines in machine family $m \in M$ |
| $r_i$ | Mean Time To Repair (MTTR) of PM task $i \in \Omega$ |
| $\eta_t$ | Capacity of labor at time period $t \in \psi$ |
| $\theta_i$ | Starting time of the warning window of PM task $i \in \Omega$. $\theta_i \in \psi^c$ |
| $\delta_i$ | Ending time of the warning window of PM task $i \in \Omega$. $\delta_i \in \psi^c$ |
| $c_i$ | Time penalty cost of doing PM $i \in \Omega$ outside the warning window |

Variables

| | |
|---|---|
| $P_{d,l,m,t}$ | Percentage of capacity of machine family $m \in M$ at period $t \in \psi$ used for manufacturing wafers of device $d \in D$ at loop $l \in \phi_d$ |
| $U_{m,t}$ | Percentage of capacity of machine family $m \in M$ at period $t \in \psi$ unavailable including PM/Qual/Down/Idle |
| $X_{i,t}$ | Binary decision variables. =1 if PM task $i \in \Omega$ is assigned to time period $t \in \psi$, =0 otherwise |

The objective function employed by the preventative maintenance scheduling unit 120 for the global optimization is:

$$\text{Maximize} \sum_{i \in \Omega} \sum_{t \in \Psi} t X_{i,t} \quad (1)$$

This objective function seeks to assign the PM as late as possible. As shown in the variable list in Table 1, X indicates the PM assignment. If a PM task is assigned to a time slot t, X(i, t) will be one. The preference specified in Equation 1 is to perform the PM task as late as possible, as long as it is still within the warning window. This maximization allows potential reduction in the number of PM tasks required every year, resulting in a reduction in PM costs. Maximizing $tX_{i,t}$ assigns the latest possible slot for allocating the PM tasks.

The following constraint provides the minimum machine capacity required to ensure the loop counts can be completed.

$$P_{d,l,m,t} \geq \frac{\mu_{d,l,m} T_{d,l,t}}{\|\Psi\| N_m} \quad \forall \ d \in D, l \in \Phi_d, m \in M, t \in \Psi \quad (2)$$

As mentioned earlier, the preventative maintenance scheduling unit 120 attempts to leave enough capacity based on the required loop counts and determines how to best utilize the machine idle time for maintenance.

The next constraint attempts to ensure that the total percentage of capacity allocated to a machine, whether in production, setup, or unavailable time, should be less than one.

$$\sum_{d \in D} \sum_{i \in \Phi_d} (P_{d,l,m,t} + S_{m,t} + U_{m,t}) \leq 1 \quad \forall \ m \in M, t \in \Psi \quad (3)$$

The concept encompassed by this constraint is that the maximum machine unavailable time, whether due to a PM task or down time, should be no more than the remaining percentages excluding production and setup. In other words, a PM task should not be scheduled if the target unavailable percentage is less than the required capacity that can be sacrificed by assigning the PM task.

$$\sum_{i \in \Omega} \lambda_{i,m} r_i X_{i,t} \leq U_{m,t} \quad \forall \ m \in M, t \in \Psi \quad (4)$$

Another constraint related to a similar concept specifies that the total capacity lost due to the PM task should be less than the total unavailable capacity, which helps ensure that the loop counts will not be affected regardless of how the PM tasks are scheduled.

In some situations, the availability of maintenance technicians may be a constraint. This situation may arise when an internal technician cannot perform the PM task and an outside vendor is used instead to maintain the machine. Hence, labor can be a bottleneck limiting the potential number of PM tasks that may be performed simultaneously. The following constraint relates to ensuring that all PM tasks allocated should have sufficient technician support.

$$\sum_{i \in \Omega} \lambda_{i,m} r_i X_{i,t} \leq \eta_t \quad \forall \ m \in M, t \in \Psi \quad (5)$$

The following constraint specifies that all PM tasks have to be allocated and can only be allocated once.

$$\sum_{i \in \Psi} X_{i,t} = 1 \quad \forall \ i \in \Omega \quad (6)$$

The following constraint requires that all PM tasks are assigned before the end of the warning window. Hence, a PM task will not be assigned to any time after the warning window. A PM task may be assigned before the start of the warning window, but not after. A PM task can be done at any time as long as it is before the expiration of the specified window. However, as managed by the objective function of Equation 1, performing a doing PM earlier is not preferred.

$$X_{i,t}=0 \;\; \forall i \in \Omega, t \in \Psi, t>[\delta_i] \tag{7}$$

The first step of the optimization described above allocates the PM tasks to time periods to ensure the execution of loop counts. After this initial global optimization, it does not matter when within the time period the PM task is actually performed with respect to the impact on loop counts. The preventative maintenance scheduling unit 120 performs a second optimization to determine when a particular PM task should be dispatched and executed by the technicians within the assigned global time period. Table 2 below specifies a notation list that identifies symbols used in the following objective and constraint equations for the local PM optimization.

TABLE 2

Notation for Local PM Optimization

Set:

| | |
|---|---|
| $O_j$ | Set of time slots in period $j \in \psi$ |
| $M_m$ | Set of machines of machine family $m \in M$ |
| $\Omega_m$ | Subset of PM tasks of machine family $m \in M$ |

Parameters

| | |
|---|---|
| $W_{LIM}$ | WIP limit |
| $W_o$ | WIP level that can be handled by the machine family with full capacity |
| $W_t$ | Predicted WIP level at time slot $t \in O_j$ |
| $\zeta_{i,k}$ | =1 if PM tasks $i \in \Omega_m$ is for machine $k \in M_m$ |

Variables

| | |
|---|---|
| $\sigma_t$ | Number of wafers that are beyond the capacity limit of the machine family at time slot $t \in O_j$ |
| $a_t$ | Availability of machine family at time slot $t \in O_j$, $0 \leq a_t \leq 1$ |
| $a_t^k$ | Availability of machine $k \in M_m$ at time slot $t \in O_j$, $0 \leq a_t^k \leq 1$ (e.g., calculated by querying a look-up table) |
| $\tau_{i,MAX}$ | Completion time of PM task $i \in \Omega_m$. $\tau_{i,MAX} \in O_j$ |
| $\tau_{i,MIN}$ | Completion time of PM task $i \in \Omega_m$. $\tau_{i,MIN} \in O_j$ |
| $Y_{i,t}$ | Binary decision variable. =1 if PM task $i \in \Omega_m$ is scheduled at time slot $t \in O_j$ |
| $\sigma_{MAX}$ | Maximum $\sigma_t$ |

The objective function employed by the preventative maintenance scheduling unit 120 for the global optimization is:

$$\text{Minimize } \sigma_{MAX} \tag{8}$$

A WIP limit is a target used to balance the manufacturing line. The WIP at certain operations is limited to prevent a bubble that could eventually generate a big disruption as it moves on through the line. The following constraint attempts to allocate the PM tasks to keep the WIP within the limit.

$$\sigma_t \leq W_{LIM} \;\; \forall t \in O_j \tag{9}$$

The following equation calculates the excess WIP that cannot be handled by the available capacity. This variable is associated with the previous time period as the WIP of the previous time period that is not processed is rolled over to the current period.

$$\sigma_t = \sigma_{t-1} + W_t - a_t W_0 \;\; \forall t \in O_j, \sigma_0 = 0 \tag{10}$$

The overall machine family availability is based on the availability of each machine in the family as indicated by the following equation.

$$a_t \leq \frac{\sum_{k \in M_m} a_t^k}{\|M_m\|} \;\; \forall t \in O_j \tag{11}$$

An objective of the optimization is to minimize the occurrences of WIP bubbles (i.e., more WIP than capacity). This objective may be interpreted as minimizing the maximum excess WIP $$\sigma_{MAX} \geq \sigma_t \;\; \forall t \in O_j \tag{12}$$

The preventative maintenance scheduling unit 120 also considers the total repair time necessary to complete a PM task in $r_i$ units. Hence, the total number of tasks allocated to time unit t should be the same as $r_i$.

$$\sum_{t \in O_j} Y_{i,t} = r_i \;\; \forall \, i \in \Omega_m, X_{i,j,m}=1 \tag{13}$$

The following three constraints help ensure that all time slots allocated to $r_i$ are consecutive. In other words, if it takes 20 minutes to complete a repair, it would not be feasible to schedule five minutes in one block and wait for two hours to complete the remaining 15 minutes. Hence, the repair is scheduled in a continuous manner.

$$\tau_{i,MAX} \geq t-(1-Y_{i,t})M \;\; \forall i \in \Omega_m, X_{i,j,m}=1 \tag{14}$$

$$\tau_{i,MIN} \leq t-(Y_{i,t}-1)M \;\; \forall i \in \Omega_m, X_{i,j,m}=1 \tag{15}$$

$$\tau_{i,MAX} - \tau_{i,MIN} \leq r_i \;\; \forall i \in \Omega_m, X_{i,j,m}=1 \tag{16}$$

An additional constraint is provided for multi-chamber tools. The availability of the machine depends on the type of PM task and which chamber has to be taken out of service. The input data is provided in a matrix lookup format.

$$a_t^k = f(X_{it}, \zeta_{ik}) \tag{17}$$

The local model also considers a situation when multiple PM tasks are assigned to the same equipment. The preventative maintenance scheduling unit 120 may attempt to consolidate these PM tasks together to reduce the possible machine shut-down time. The preventative maintenance scheduling unit 120 also balances the PM tasks across multiple machines in a particular machine family to provide available capacity for the machine family that is steady throughout the time period.

Figure 2:
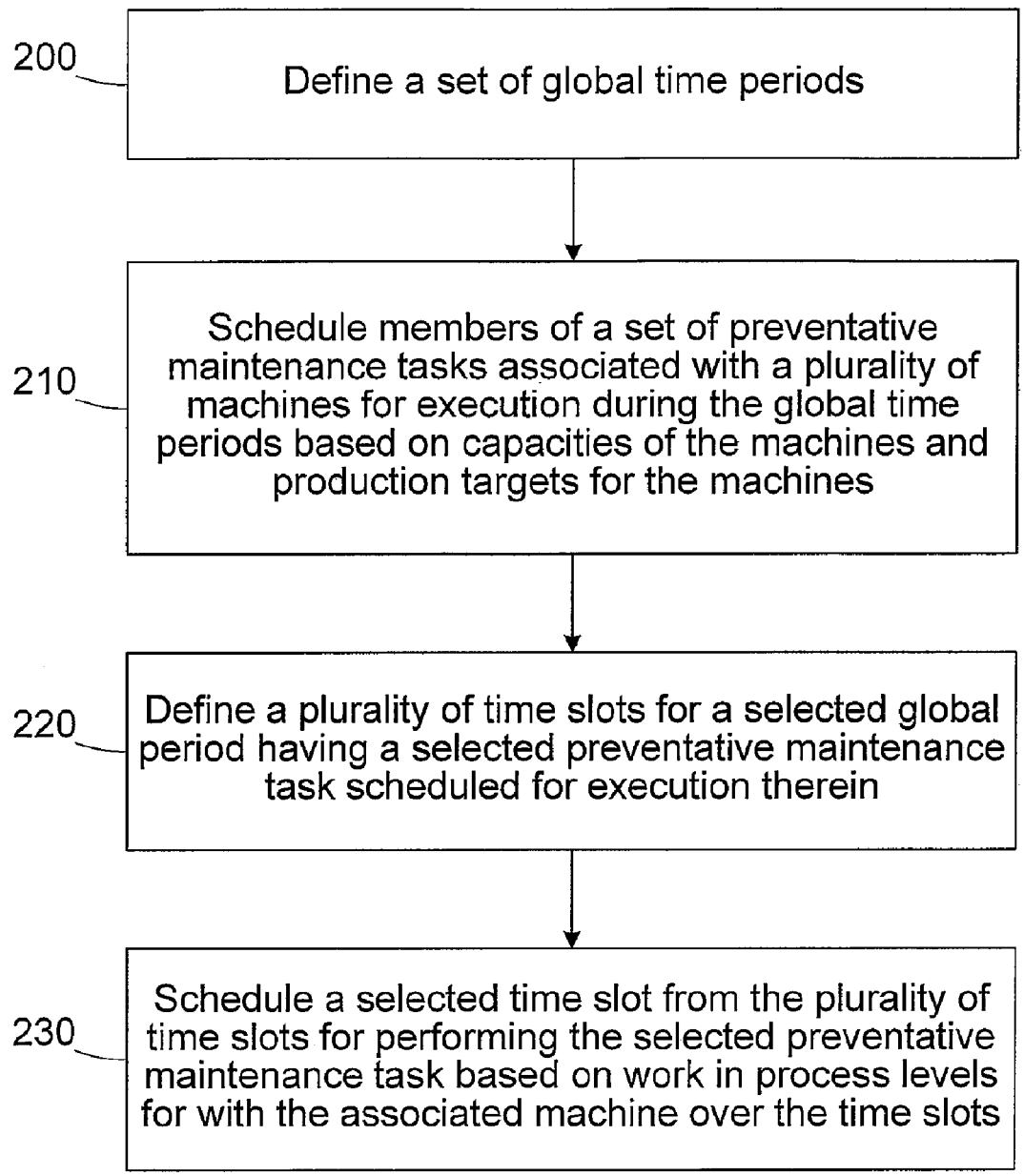
FIG. 2 is a simplified flow diagram of a method for scheduling preventative maintenance tasks in accordance with another embodiment of the present invention.

Turning now to FIG. 2, a simplified block diagram of a method for scheduling preventative maintenance tasks in accordance with an illustrative embodiment of the present invention is provided. In method block 200, a set of global time periods is defined. In method block 210 members of a set of preventative maintenance tasks associated with a plurality of machines are scheduled for execution during the global time periods based on capacities of the machines and production targets for the machines. In method block 220, a plurality of time slots is defined for a selected global period having a selected preventative maintenance task scheduled for execution therein. In method block 230, a selected time slot from the plurality of time slots is scheduled for performing the selected preventative maintenance task based on work in process levels for with the associated machine over the time slots.

Optimizing the PM scheduling from both a global production capacity standpoint, as well as a local machine availability standpoint reduces the impacts of preventative maintenance on the manufacturing system. Moreover, the interval between preventative maintenance procedures may be maximized resulting in decreased maintenance expenses and throughput advantages. These advantages increase the efficiency, and as a result, the profitability of the manufacturing system.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method for scheduling preventative maintenance tasks, comprising:
defining a set of global time periods;
scheduling members of a set of preventative maintenance tasks associated with a plurality of machines for execution during the global time periods based on capacities of the machines and production targets for the machines;
defining a plurality of time slots for a selected global period having a selected preventative maintenance task scheduled for execution therein; and
scheduling a selected time slot from the plurality of time slots for performing the selected preventative maintenance task based on work in process levels for with the associated machine over the time slots.

2. The method of claim 1, wherein the machines are grouped into manufacturing loops, and the production targets comprise loop counts associated with the manufacturing loops.

3. The method of claim 2, wherein each manufacturing loop is operable to fabricate a layer on a semiconductor substrate.

4. The method of claim 1, wherein scheduling members of the set of preventative maintenance tasks during the global time periods further comprises maximizing a latest completion time of the preventative maintenance tasks.

5. The method of claim 1, wherein scheduling members of the set of preventative maintenance tasks during the global time periods further comprises determining machine capacities required to meet the production targets.

6. The method of claim 1, wherein scheduling members of the set of preventative maintenance tasks during the global time periods further comprises scheduling the global time periods based on a labor capacity associated with the preventative maintenance tasks.

7. The method of claim 1, wherein a subset of the machines is grouped into a machine family including the associated machine, and scheduling the selected time slot further comprises scheduling the selected time slot based on work in process levels associated with the machine family.

8. The method of claim 7, wherein scheduling the selected time slot further comprises scheduling the selected time slot to minimize a maximum work in process for the associated machine family over the time slots.

9. The method of claim 1, wherein scheduling the preventative maintenance tasks further comprises optimizing at least one objective function subject to a plurality of constraints.

10. The method of claim 1, further comprising performing the selected preventative maintenance task during the scheduled time slot.

11. A method for scheduling preventative maintenance tasks, comprising:
defining a set of global time periods;
performing a global optimization to schedule members of a set of preventative maintenance tasks associated with a plurality of machines grouped into machine families for execution during the global time periods based on capacities of the machine families and production targets;
defining a plurality of time slots for each of the global periods having at least one of the preventative maintenance tasks scheduled for execution therein; and
performing a local optimization to schedule selected time slots within the global time periods for performing the preventative maintenance tasks based on work in process levels for selected machine families associated with the preventative maintenance tasks.

12. The method of claim 11, wherein performing the global optimization further comprises optimizing an objective function configured to maximize latest completion times of the preventative maintenance tasks subject to a first plurality of constraints.

13. The method of claim 12, wherein performing the local optimization further comprises optimizing an objective function configured to minimize maximum work in process associated with the machine families over the time slots subject to a second plurality of constraints.

14. The method of claim 11, wherein the machines are grouped into manufacturing loops, and the production targets comprise loop counts associated with the manufacturing loops.

15. The method of claim 14, wherein each manufacturing loop is operable to fabricate a layer on a semiconductor substrate.

16. The method of claim 12, wherein performing the global optimization further comprises determining capacities of the machine families required to meet the production targets.

17. The method of claim 16, wherein performing the global optimization further comprises scheduling the global time periods based on a labor capacity associated with the preventative maintenance tasks.

18. The method of claim 11, further comprising performing a selected preventative maintenance task during the scheduled time slot.

19. A system, comprising:
a plurality of machines for processing workpieces in a process flow; and
a preventative maintenance scheduling unit operable to define a set of global time periods, schedule members of a set of preventative maintenance tasks associated with the plurality of machines for execution during the global time periods based on capacities of the machines and production targets for the machines, define a plurality of time slots for a selected global period having a selected preventative maintenance task scheduled for execution therein, and schedule a selected time slot from the plurality of time slots for performing the selected preventative maintenance task based on work in process levels for with the associated machine over the time slots.

20. A system, comprising:
means for defining a set of global time periods;
means for scheduling members of a set of preventative maintenance tasks associated with a plurality of machines for execution during the global time periods based on capacities of the machines and production targets for the machines;

means for defining a plurality of time slots for a selected global period having a selected preventative maintenance task scheduled for execution therein; and means for scheduling a selected time slot from the plurality of time slots for performing the selected preventative maintenance task based on work in process levels for with the associated machine over the time slots.

* * * * *